(12) United States Patent
Nagabayashi et al.

(10) Patent No.: US 12,085,491 B2
(45) Date of Patent: Sep. 10, 2024

(54) TISSUE PIECE TREATING APPARATUS

(71) Applicants: SAKURA SEIKI CO., LTD., Nagano (JP); SAKURA FINETEK JAPAN CO., LTD., Tokyo (JP)

(72) Inventors: Tetsu Nagabayashi, Nagano (JP); Takahiro Sakurai, Nagano (JP)

(73) Assignees: SAKURA SEIKI CO., LTD., Nagano (JP); SAKURA FINETEK JAPAN CO., LTD., Tokyo (JP)

( * ) Notice: Subject to any disclaimer, the term of this patent is extended or adjusted under 35 U.S.C. 154(b) by 611 days.

(21) Appl. No.: 17/413,569

(22) PCT Filed: Nov. 12, 2019

(86) PCT No.: PCT/JP2019/044209
§ 371 (c)(1),
(2) Date: Jun. 13, 2021

(87) PCT Pub. No.: WO2020/144933
PCT Pub. Date: Jul. 16, 2020

(65) Prior Publication Data
US 2022/0050030 A1    Feb. 17, 2022

(30) Foreign Application Priority Data

Jan. 11, 2019    (JP) ................................. 2019-003807

(51) Int. Cl.
*G01N 1/00* (2006.01)
*G01N 1/31* (2006.01)
*G01N 1/36* (2006.01)

(52) U.S. Cl.
CPC .................. *G01N 1/31* (2013.01); *G01N 1/36* (2013.01); *G01N 2001/315* (2013.01)

(58) Field of Classification Search
None
See application file for complete search history.

(56) References Cited

U.S. PATENT DOCUMENTS

| 7,147,826 B2 * | 12/2006 | Haywood | ............... B01L 3/502 |
| | | | 435/288.1 |
| 2013/0071858 A1 | 3/2013 | Bui et al. | |
| 2018/0156701 A1 | 6/2018 | Williamson, IV | |

FOREIGN PATENT DOCUMENTS

| CN | 104510328 A | 4/2015 |
| CN | 105751695 A | 7/2016 |
| JP | S59221246 A | 12/1984 |
| JP | 2001124677 A | 5/2001 |

(Continued)

OTHER PUBLICATIONS

Related Application, Japanese Patent Application No. 2019-003807, Notice of Reasons for Refusal, Date: Sep. 7, 2022.

(Continued)

*Primary Examiner* — Jyoti Nagpaul
(74) *Attorney, Agent, or Firm* — William Thomas Babbitt (57) ABSTRACT

A tissue piece treating apparatus including a storage container in which a tissue piece is operable to be housed, and a treating tank in which the storage container is housed, the storage container includes a plurality of through holes, the treating tank is disposed to a main body part by being inclined relative to a horizontal direction, and the storage container is housed by being inclined at the same angle as the treating tank.

5 Claims, 5 Drawing Sheets

(56) References Cited

FOREIGN PATENT DOCUMENTS

| JP | 2001296219 A | 10/2001 |
|----|--------------|---------|
| JP | 2008051721 A | 3/2008  |
| JP | 2008139327 A | 6/2008  |
| JP | 2015001512 A | 1/2015  |
| JP | 2016507435 A | 3/2016  |

OTHER PUBLICATIONS

Sakura Seiko Co., Ltd., et al., Related Application, Extended European Search Report for Application No. PCT/JP/2019044209, Dated Aug. 25, 2021.
Sakura Seiki Co., Ltd. and Sakura Finetek Japan Co., Ltd.; Related Applicaiton, International Application No. PCT/JP2019/044209; International Search Report Dated Jan. 21, 2020.
Related Application, China Patent Application No. 201980070990. 7, Office Action, Dated: Nov. 7, 2023.

* cited by examiner

V PORTION

TISSUE PIECE TREATING APPARATUS

CROSS-REFERENCE TO RELATED APPLICATIONS

The present Application is a national stage of International Patent Application No. PCT/JP2019/044209, titled "Tissue Fragment Treatment Device," filed Nov. 12, 2019, which claims priority from Japanese Patent Application No. 2019-003807, filed Jan. 11, 2019, the contents of which are incorporated in this disclosure by reference in their entirety.

TECHNICAL FIELD

The present invention relates to a tissue piece treating apparatus, and more specifically relates to a tissue piece treating apparatus that performs treatment necessary for producing a microscopic specimen of a tissue piece collected from a living thing including a human body.

BACKGROUND ART

As a pretreatment for observing a tissue piece (sample) collected from a living thing with a microscope, specimen production treatment in which fixing treatment, dehydrating treatment, degreasing treatment, and permeating treatment (embedding treatment) are performed in this order is performed. A tissue piece treating apparatus that automatically performs the treatment has been widely used (see, PTL 1: JP-A-2015-1512).

The specimen production treatment using the abovementioned tissue piece treating apparatus is generally progressed as follows. One piece or several pieces of tissue pieces collected from a living thing are housed in each of small containers called cassettes. Next, one or a plurality of the cassettes are housed in a storage container (basket). Next, the storage container is housed in a treating tank (retort) of the tissue piece treating apparatus. The tissue piece treating apparatus is then activated, and chemical solutions of several types stored in respective chemical solution bottles are supplied to and discharged from an inside of the treating tank in a prescribed order. Therefore, the tissue pieces are immersed into the chemical solutions of the several types, thereby performing the specimen production treatment. Note that, the chemical solution discharged from the inside of the treating tank is returned to the chemical solution bottle, and is repeatedly used until it is determined that the chemical solution is unavailable due to the concentration reduction and other degradation.

CITATION LIST

Patent Literature

PTL 1: JP-A-2015-1512

SUMMARY OF INVENTION

Technical Problem

In such a tissue piece treating apparatus, chemical solutions of several types are supplied to and discharged from one treating tank. Accordingly, when the chemical solution remains after the chemical solution has been discharged from the treating tank, the remaining chemical solution is mixed into a different chemical solution to be supplied next. Accordingly, in the case that the remaining amount of the chemical solution when the chemical solution is discharged from the treating tank is large, a chemical solution to be supplied next is likely to be degraded due to the concentration reduction.

Herein, in the conventional tissue piece treating apparatus, the chemical solution adhered on an inner surface of the treating tank, the storage container, and the cassettes after the chemical solution has discharged from the treating tank is comparatively large, and the chemical solution has been likely to be degraded. Accordingly, the chemical solution needs to be replaced at a high frequency, so that there has been a problem of an increase in the use amount of the chemical solution. Therefore, when the chemical solution is discharged from the treating tank, improvement in the liquid exhaustion (removal of the chemical solution) has been desired.

Solution to Problem

The present invention has been accomplished under the abovementioned circumstances, and aims to provide a tissue piece treating apparatus that is excellent in liquid exhaustion when a chemical solution is discharged from a treating tank, suppresses degradation due to concentration reduction of the chemical solution, and suppresses a replacement frequency of the chemical solution, thereby making it possible to reduce a use amount of the chemical solution.

The present invention solves the problems by a solution as described below, as one embodiment.

A tissue piece treating apparatus according to the present invention needs to have such a configuration that the tissue piece treating apparatus includes: a storage container in which a tissue piece is housed; and a treating tank in which the storage container is housed, in which the storage container includes a plurality of through holes, the treating tank is disposed to a main body part by being inclined relative to a horizontal direction, and the storage container is housed by being inclined at the same angle as the treating tank.

Therefore, the treating tank is disposed by being inclined, whereby the storage container and tissue pieces (as one example, a state of being housed in a cassette) to be housed in the treating tank can be arranged by being inclined. Accordingly, the chemical solution adhered on the cassette and the storage container is caused to move down along an inclined surface (specially, bottom surface of the storage container) with the effect of the gravity, thereby making it possible to drop the chemical solution from the plurality of through holes (discharge the chemical solution from the storage container to the bottom surface of the treating tank).

In addition, the chemical solution flowed out to the bottom surface of the treating tank can be discharged to an outside of the treating tank while causing the chemical solution to move down along the inclined surface (bottom surface of the treating tank) with the effect of the gravity and to be collected. As a result, the tissue piece treating apparatus in which the treating tank is excellent in the liquid exhaustion as compared with the conventional one can be implemented.

Moreover, the treating tank is preferably disposed by being inclined downward toward a front surface of the main body part that faces a worker. Therefore, as compared with the conventional tissue piece treating apparatus in which the treating tank is not inclined, the treating tank can be likely to be put in and taken out from the storage container.

Moreover, an opening/closing lid that opens and closes an opening part in an upper portion of the treating tank is preferably provided, and the opening/closing lid preferably includes, in a state where the opening/closing lid is closed, in an inner surface thereof, a first groove part in a first end portion that becomes a lower portion in an inclined direction and a second groove part in a second end portion that becomes an upper portion in the inclined direction. Therefore, in the state where the opening/closing lid is closed, the chemical solution condensed in the inner surface of the opening/closing lid can be received by the first groove part, while, in a state where the opening/closing lid is open, water droplets condensed in the inner surface of the opening/closing lid can be received by the second groove part.

Moreover, the through hole is preferably formed in a polygonal shape or an oval shape, and is preferably provided such that one vertex in a case of the polygonal shape or one end portion in a case of the oval shape is arranged at a position in the lower portion in the inclined direction in a state where the storage container is housed in the treating tank. Therefore, the chemical solution is caused to move down along inner edges of the holes of the polygonal shape or the oval shape, and is dropped from the vertex or the end portion in the lower end, thereby making it possible to facilitate the effect of dropping the chemical solution from the through holes.

Moreover, the through hole is preferably formed in a circular shape. Therefore, the chemical solution is caused to move down along an inner edge of the hole of the circular shape, and is dropped from a lower end of the arc, thereby making it possible to facilitate the effect of discharging the chemical solution from the through holes.

Moreover, the treating tank preferably includes one or plurality of discharge ports, and the discharge port is preferably disposed to a position in the lowermost portion in the inclined direction of the treating tank. This allows the chemical solution moving down along the inclination to be collected at the position of the lowermost portion of the inclination, and to be discharged to the outside of the treating tank such that the chemical solution does not remain in the treating tank.

Advantageous Effects of Invention

According to the present invention, it is possible to implement a tissue piece treating apparatus that is excellent in liquid exhaustion when a chemical solution is discharged from a treating tank, suppresses degradation due to concentration reduction of the chemical solution, and suppresses a replacement frequency of the chemical solution, thereby making it possible to reduce a use amount of the chemical solution.

DESCRIPTION OF EMBODIMENTS

Figure 1:
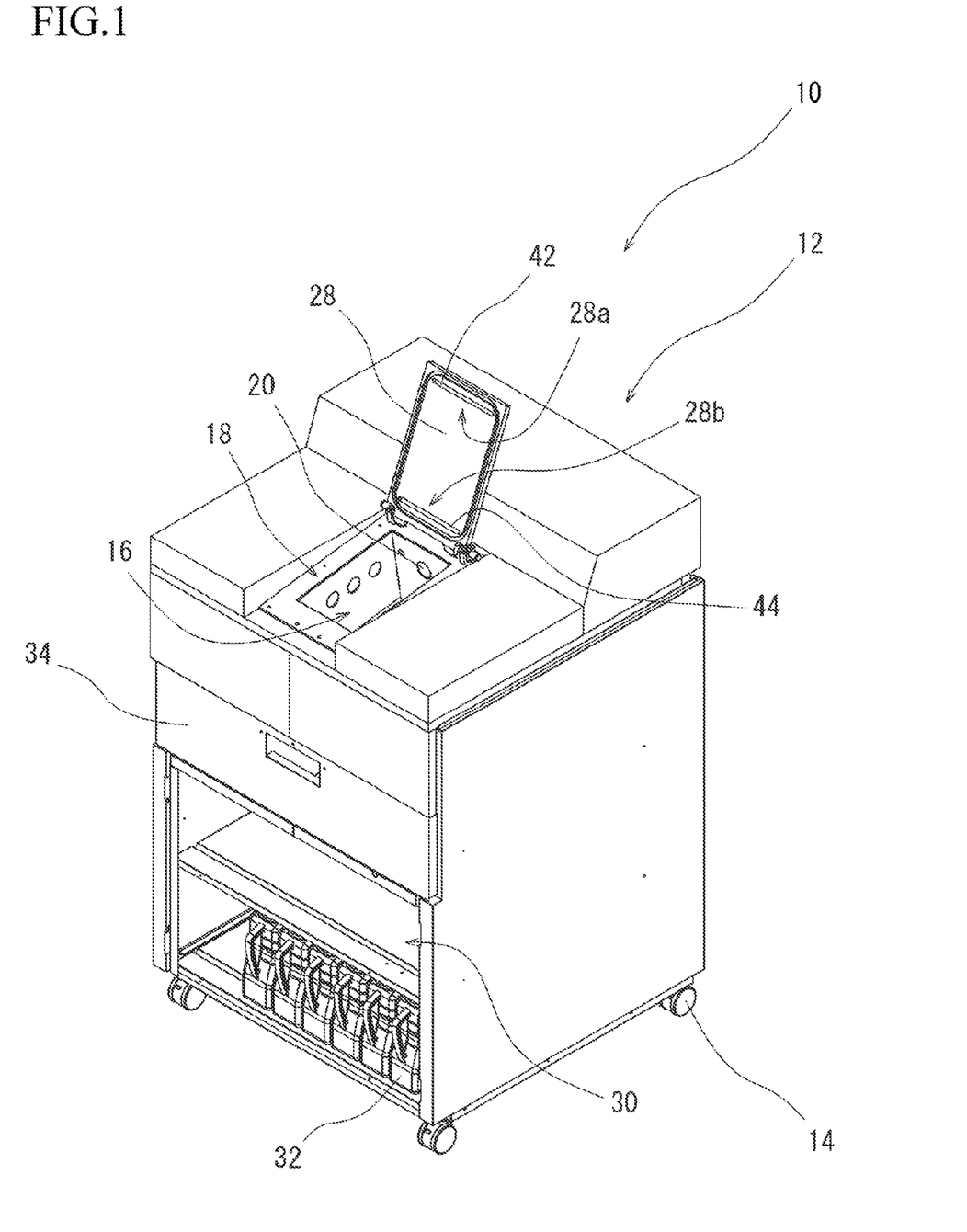
FIG. 1 is a schematic view (perspective view) illustrating an example of a tissue piece treating apparatus according to an embodiment of the present invention.
Figure 2:
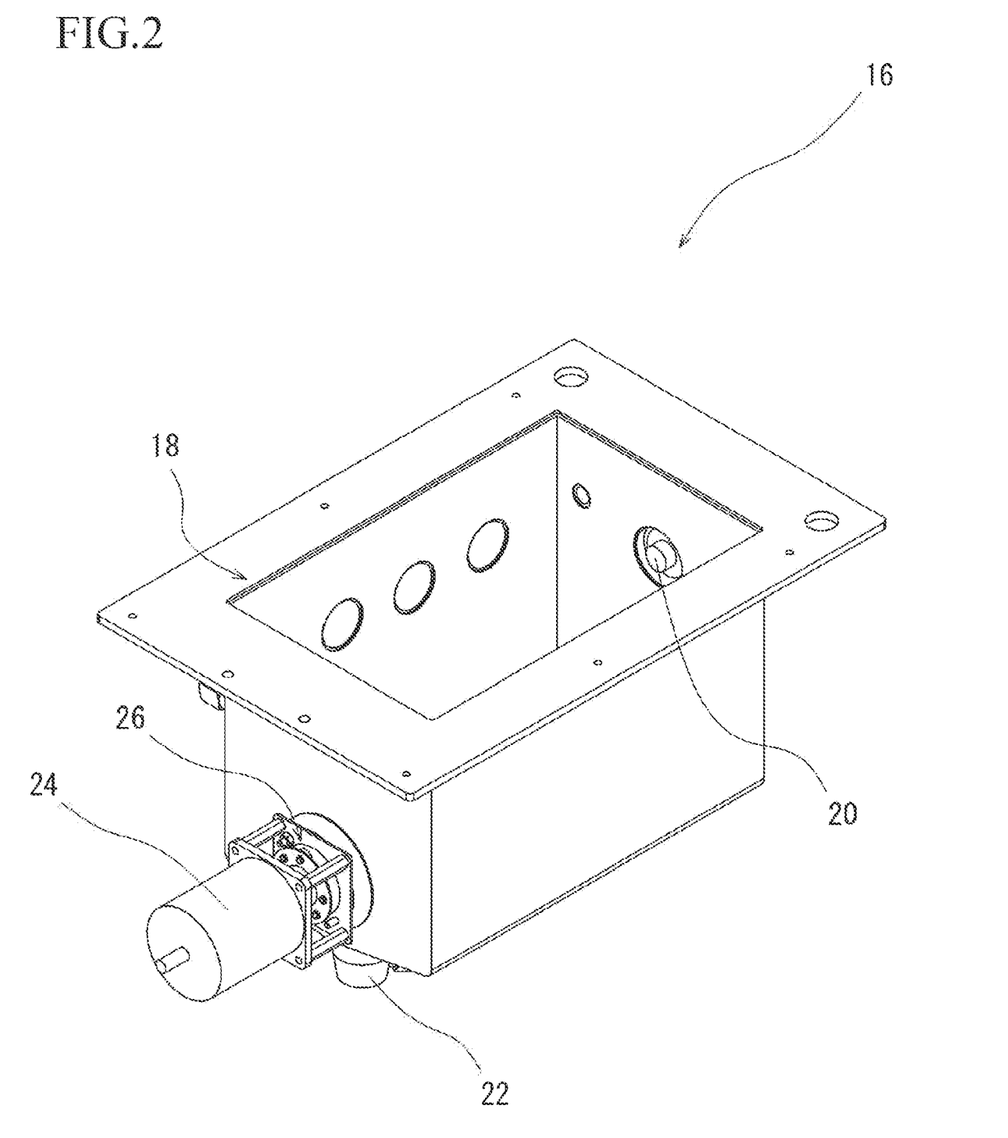
FIG. 2 is a schematic view (perspective view) illustrating an example of a treating tank in the tissue piece treating apparatus in FIG. 1.
Figure 3:
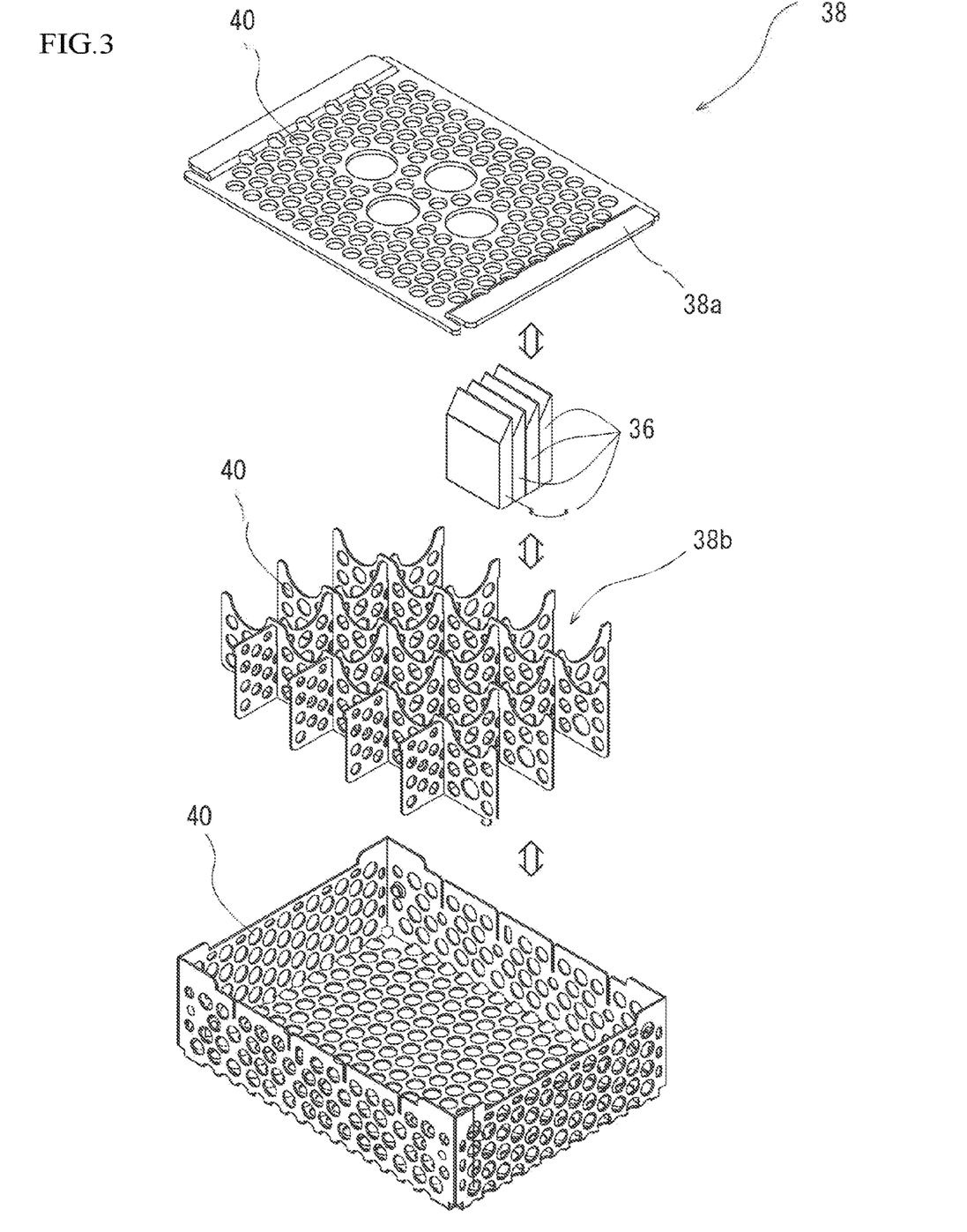
FIG. 3 is a schematic view (perspective view) illustrating an example of a storage container that is housed in the treating tank in FIG. 2, and a cassette that is housed in the storage container.

Hereinafter, an embodiment of the present invention will be described in detail with reference to the drawings. FIG. 1 is a schematic view (perspective view) illustrating an example of a tissue piece treating apparatus 10 according to an embodiment of the present invention. Moreover, FIG. 2 is a schematic view (perspective view) illustrating an example of a treating tank 16 in the tissue piece treating apparatus 10 in FIG. 1. Moreover, FIG. 3 is a schematic view (perspective view) illustrating an example of a storage container 38 that is housed in the treating tank 16 in FIG. 2, and a cassette 36 that is housed in the storage container 38. Note that, in all the drawings, elements having the same function are assigned with the same reference numerals and repeated explanations thereof are omitted in some cases.

The tissue piece treating apparatus 10 according to the present embodiment is an apparatus that automatically performs treatment necessary for producing a microscopic specimen of a tissue piece collected from a living thing including a human body. The tissue piece treating apparatus 10 is configured so as to be movable, as illustrated in FIG. 1, by mounting arbitrary casters 14 to a rectangular main body part 12. The main body part 12 is provided with a monitor (which is not illustrated) on which a setting screen, ongoing treatment, or the like is displayed as one example, on a top surface thereof. An operating part such as a touch panel or the like is arbitrarily mounted to the monitor (which is not illustrated). Moreover, on the top surface of the main body part 12, an opening part 18 in an upper portion of the treating tank 16 (also referred to as the retort) disposed to the main body part 12 is opened therein, and an opening/closing lid 28 (also referred to as a retort lid) that opens and closes the opening part 18 is mounted thereto.

Herein, the treating tank 16 illustrated in FIG. 2 is a container in which a tissue piece is immersed into chemical solutions of several types to perform specimen production treatment. The treating tank 16 having a fixed volumetric capacity is formed in a rectangular parallelepiped shape as one example in the present embodiment, but is not limited thereto. It can also be considered that the treating tank 16 is formed in a cubic shape or a cylindrical shape, for example. Moreover, a bottom portion thereof is formed in a planar shape as one example in the present embodiment, but is not limited thereto. It can also be considered that the bottom portion is formed in a funnel shape, or a pyramid or cone shape, for example. Moreover, in an inner surface of the treating tank 16, a supply inlet 20 through which a chemical solution is supplied is disposed to a side surface thereof, and a discharge port 22 from which the chemical solution is discharged is disposed to a bottom surface thereof. In addition, a reference numeral 24 indicates a motor, a reference numeral 26 indicates a rotating body that can rotate by being driven by the motor 24, and a stirring bar (which is not illustrated) is provided at a position in an inside of the treating tank 16 corresponding to a position of the rotating body 26 in an outside of the treating tank 16. The rotating body 26 and the stirring bar (which is not illustrated) each have a configuration of having a built-in magnet. This allows the rotating body 26 to rotate by being driven by the motor 24 to rotate the stirring bar (which is not illustrated), and thus a liquid stored in the treating tank 16 to be stirred.

Moreover, a tissue piece collected from a human body or the like is normally housed in the treating tank 16 as follows. In other words, as illustrated in FIG. 3, firstly, one piece or several pieces of tissue pieces are housed in each small container called the cassette 36. Next, one or a plurality of the cassettes 36 are housed in the storage container 38 (also referred to as the basket). Next, the storage container 38 is housed in the treating tank 16. The storage container 38 is provided with a fixed lid 38a, and is arbitrarily provided with a partition plate 38b corresponded to the size of the cassette 36. Moreover, a plurality of through holes 40 are formed in each member including the fixed lid 38a and the partition plate 38b. The shape of the storage container 38 is not limited, and is formed in a shape of a planar shape similar to a planar shape of the treating tank 16 as one example in the present embodiment. This allows a reduced clearance that is generated in the treating tank 16 when the storage container 38 is housed therein, and allows a space in the treating tank 16 to be used with zero waste. Characteristic configurations of the treating tank 16, the opening/closing lid 28, and the storage container 38 for solving the problems of the present invention are described later.

Next, the main body part 12 is provided with a bottle rack 30 of a plurality of stages (two stages in the present embodiment) at a lower portion in an inside thereof, as illustrated in FIG. 1. In the bottle rack 30, a plurality of the chemical solution bottles 32 (illustrated only a part thereof) that store therein formalin for performing fixing treatment, alcohol for performing dehydrating treatment, xylene for performing degreasing treatment, and the like are disposed. In the treatment related to the production of a specimen, the same treatment is performed for a plurality of times, and the plurality of the chemical solution bottles 32 that store therein the chemical solution of the same type are thus disposed in the bottle rack 30. Moreover, the main body part 12 is provided with, in an inside thereof, an oven 34 that can heat and hold the inside at a constant temperature, in the central portion. In the oven 34, a plurality of chemical solution bottles (which are not illustrated) for performing permeating treatment (embedding treatment) are disposed. This allows the paraffin that is solidified at an ambient temperature to hold in a fused state and to be waited for treatment. Note that, the holding temperature of the oven 34 is about 60[°] C. as one example. Moreover, the main body part 12 is provided with a replaceable filter (which is not illustrated) that removes an odor of a gas of the evaporated chemical solution, in an upper portion in the inside thereof. As the filter (which is not illustrated), as one example, an activated carbon filter is used.

Moreover, the tissue piece treating apparatus 10 is provided with the following configuration related to an operation, in an inside thereof. Firstly, a selection valve (which is not illustrated) that is connected to the treating tank 16 via a pipe at one part, and is connected to the plurality of the chemical solution bottles 32 via respective pipes at the other part is provided. The selection valve (which is not illustrated) makes one chemical solution bottle 32 selected from these chemical solution bottles 32 communicable with the treating tank 16. As the selection valve (which is not illustrated), as one example, a rotary valve is used.

Secondary, a switching valve (which is not illustrated) is provided halfway through the pipe that connects the treating tank 16 to the selection valve (which is not illustrated). The switching valve (which is not illustrated) is connected to the selection valve (which is not illustrated) via the pipe, and is also connected to the supply inlet 20 and the discharge port 22 of the treating tank 16, via respective pipes. The switching valve (which is not illustrated) causes, when a chemical solution is supplied (transported) to the treating tank 16, the pipe to the supply inlet 20 to be in an open state and the pipe to the discharge port 22 to be in a closed state, thereby communicating the selection valve (which is not illustrated) with the supply inlet 20. Moreover, when a chemical solution is discharged (transported) from the treating tank 16, the switching valve (which is not illustrated) causes the pipe to the discharge port 22 to be in an open state and the pipe to the supply inlet 20 to be in a pipe closed state, thereby communicating the discharge port 22 with the selection valve (which is not illustrated). Moreover, when a tissue piece is immersed into the chemical solution in the treating tank 16, the switching valve (which is not illustrated) causes the respective pipes to the supply inlet 20 and the discharge port 22 to be in the closed state, thereby interrupting the treating tank 16 from the selection valve (which is not illustrated).

Thirdly, an air pump (which is not illustrated) that is connected to the treating tank 16 via the pipe is provided. The air pump (which is not illustrated) performs gas exchange in the treating tank 16. Moreover, when a chemical solution is transported (led into) to the treating tank 16 from the selected chemical solution bottle 32, the inside of the treating tank 16 is decompressed. Moreover, a chemical solution is transported (sent out) to the selected chemical solution bottle 32 from the treating tank 16, the inside of the treating tank 16 is pressurized.

Fourthly, the selection valve (which is not illustrated), the switching valve (which is not illustrated), and the air pump (which is not illustrated) are electrically connected to a controller (which is not illustrated) via respective wiring. The controller (which is not illustrated) to which an operation program is set in advance includes a CPU and a memory, and performs the control of the abovementioned respective configurations on the basis of a set signal that is input from the abovementioned operating part or the like. This allows the selection valve (which is not illustrated), the switching valve (which is not illustrated), and the air pump (which is not illustrated) to operate in response to one another.

With the configuration in the foregoing, the desired chemical solution bottle 32 is selected by the operation of the selection valve (which is not illustrated) and the pipe to the supply inlet 20 is caused to be in the open state by the switching of the switching valve (which is not illustrated), whereby a flow path from the chemical solution bottle 32 via the supply inlet 20 to the inside of the treating tank 16 is opened. Further, the inside of the treating tank 16 is decompressed by the air pump (which is not illustrated), whereby the chemical solution in the chemical solution bottle 32 can be supplied (transported) to the inside of the treating tank 16. Next, the pipe to the supply inlet 20 is then caused to be in the closed state by the switching by the switching valve (which is not illustrated), whereby the chemical solution can be stored in the inside of the treating tank 16 and the tissue piece can be immersed. The desired chemical solution bottle 32 (tank in which the chemical solution has been stored or another tank) is selected by the operation of the selection valve (which is not illustrated) and the pipe to the discharge port 22 is caused to be in the open state by the switching of the switching valve (which is not illustrated), whereby a flow path from the inside of the treating tank 16 via the discharge port 22 to the chemical solution bottle 32 is opened. The inside of the treating tank 16 is then pressurized by the air pump (which is not illustrated), whereby the chemical solution in the inside of the treating tank 16 can be discharged (transported) to the chemical solution bottle 32. In addition, the series of operations can be performed in this order by the control by the controller (which is not illustrated) with respect to the plurality of the chemical solution bottles 32. In other words, as a specific chemical solution treatment example, specimen production treatment in which a tissue piece in the inside of the treating tank 16 is immersed into formalin to perform the fixing treatment, is immersed into alcohol to perform the dehydrating treatment, is immersed into xylene to perform the degreasing treatment, and is immersed into paraffin to perform the permeating treatment (embedding treatment) can be conducted.

Herein, the chemical solution discharged (transported) from the inside of the treating tank 16 into the chemical solution bottle 32 is repeatedly used until it is determined that the chemical solution is unavailable due to the concentration reduction and other degradation. A concentration sensor (which is not illustrated) is mounted to the tissue piece treating apparatus 10 according to the present embodiment. This allows the worker to check the propriety of reuse of each chemical solution bottle 32 by checking the concentration of each chemical solution at the time of the operation start or the like.

In this manner, in the tissue piece treating apparatus 10, chemical solutions of several types are continuously supplied and discharged in the inside of the treating tank 16. Accordingly, the chemical solution that adheres on and remains in the inside of the treating tank 16 (the inner surface of the treating tank 16, the storage container 38, and the cassette 36) after the chemical solution has been discharged is mixed into a different chemical solution to be supplied next. Accordingly, poor liquid exhaustion (removal of the chemical solution) when the chemical solution is discharged facilitates the degradation due to the concentration reduction of the chemical solution. This arises a problem for not only chemical solutions of different types but rather for chemical solutions of the same type.

In other words, for example, in the dehydrating treatment using alcohol, moisture is gradually oozed out from the tissue piece by immersion treatment for a plurality of times (seven times in the present embodiment). Much moisture is normally oozed out from the tissue piece with the smaller number of treatment times, the moisture gradually becomes less every time the treatment is repeated, the least moisture is oozed out in the last treatment, so that the concentration reduction with the treatment becomes large in the alcohol that is used for the treatment earlier. Accordingly, the controller (which is not illustrated) suppresses the degradation of the entire alcohol to the minimum by receiving information on the concentration of alcohol stored in each chemical solution bottle 32 from a concentration sensor (which is not illustrated), and subjecting each alcohol with the lowest concentration sequentially to the treatment. Accordingly, when alcohol remained in the inside of the treating tank 16 is mixed into alcohol to be supplied next, the alcohol with the low concentration is mixed into the alcohol with the high concentration, so that the concentration of the alcohol to be supplied next is lowered and degraded.

The example in the foregoing similarly occurs in the degreasing treatment or the like by xylene. As a result, the chemical solution needs to be replaced at the high frequency, which results in an increase in the use amount of the chemical solution. Therefore, the present invention has implemented the tissue piece treating apparatus 10 that is excellent in the liquid exhaustion (removal of the chemical solution) when the chemical solution is discharged with the following characteristic configuration.

Figure 4:
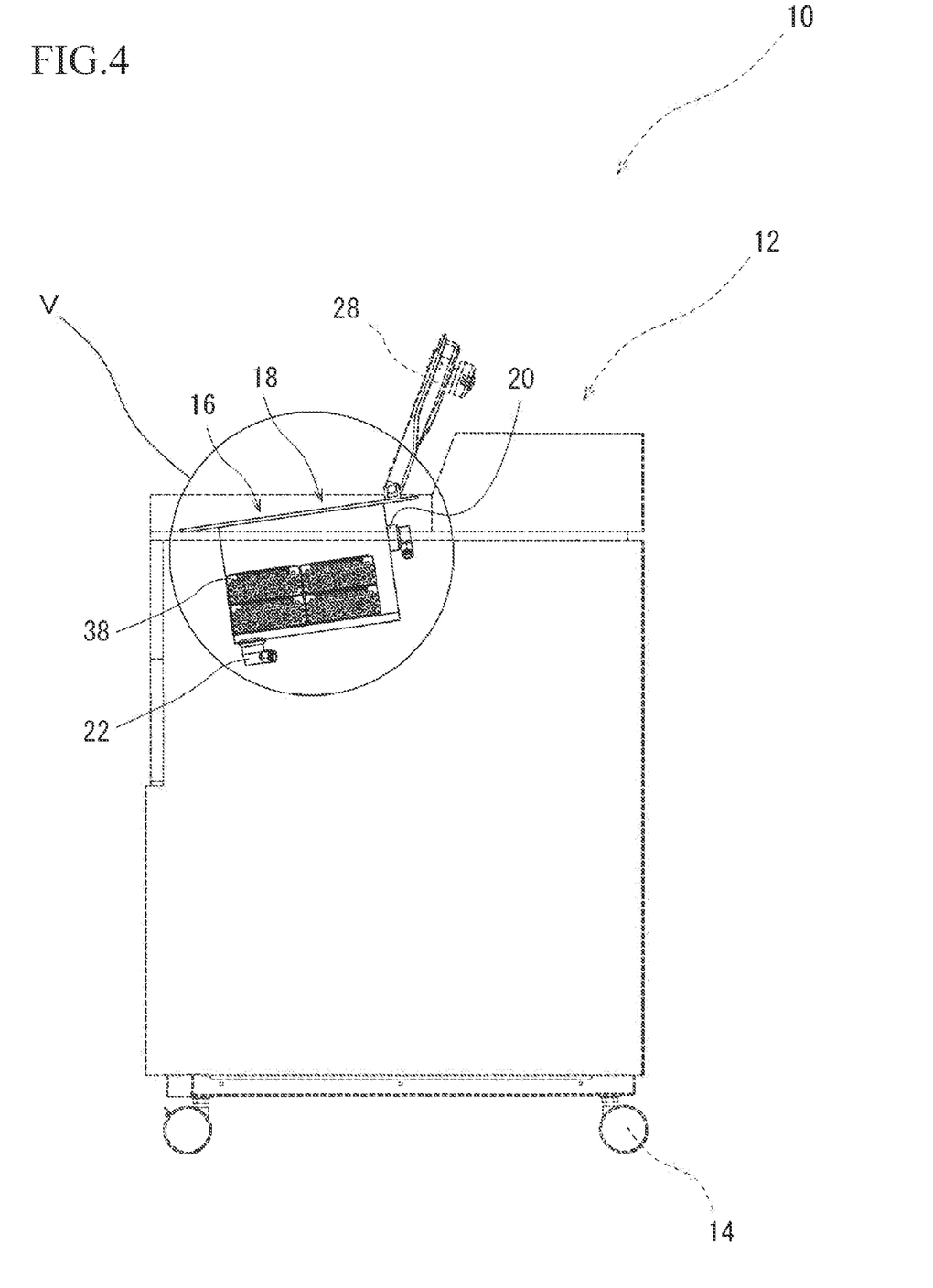
FIG. 4 is a schematic view (side view) illustrating an arrangement example of the treating tank in FIG. 2 in the tissue piece treating apparatus in FIG. 1.
Figure 5:
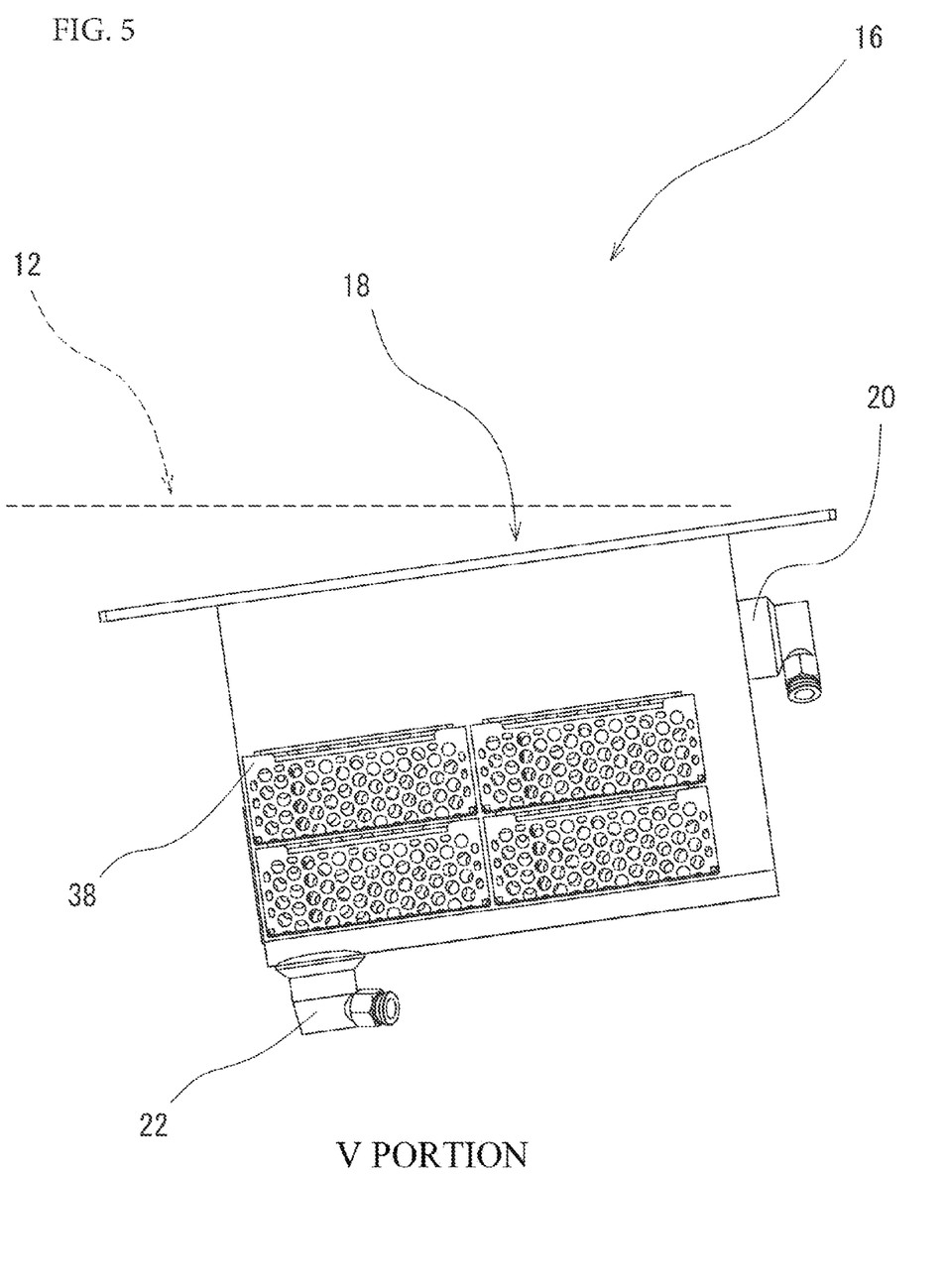
FIG. 5 is an enlargement view of the treating tank in FIG. 4.

FIG. 4 is a schematic view (side view) illustrating an arrangement example of the treating tank 16 of the tissue piece treating apparatus 10 in the present embodiment. Moreover, FIG. 5 is an enlargement view (view in which a portion indicated by V in FIG. 4 is enlarged) of the treating tank 16 in FIG. 4. Note that, a dashed line in FIG. 5 indicates the top surface of the main body part 12, and indicates the horizontal direction.

Firstly, as illustrated in FIGS. 4 and 5, the treating tank 16 is disposed to the main body part 12 by being inclined relative to the horizontal direction, and has a configuration in which the storage container 38 is housed by being inclined at the same angle as the treating tank 16. Herein, "the same" is not limited to perfectly the same, but includes a case where there is a difference of several degrees.

With this configuration, treating tank 16, the storage container 38, and each cassette 36 containing a tissue piece to be housed in the storage container 38 can all be disposed by being inclined to the main body part 12. Accordingly, with the effect of the gravity, the chemical solution adhered on the cassettes 36 and the storage container 38 is caused to move down along a bottom surface (especially inner surface) of the inclined storage container 38, thereby making it possible to facilitate the chemical solution to be discharged from the plurality of the through holes 40 to a bottom surface of the treating tank 16. In addition, the chemical solution flowed out (stored) to the bottom surface of the treating tank 16 can be discharged from the discharge port 22 to the outside of the treating tank 16 while causing the chemical solution to move down along the inclined surface (bottom surface of the treating tank 16) and to be collected. As a result, the tissue piece treating apparatus 10 in which the treating tank 16 is excellent in the liquid exhaustion as compared with the conventional one can be implemented. An inclined angle of the treating tank 16 is basically set large to result in the excellent liquid exhaustion, and a range of 40 to 50[°] is suitable. Meanwhile, when an increase in the use amount of the chemical solution due to an increase in the volumetric capacity of the treating tank 16 with the increased inclined angle and an upsizing of the tissue piece treating apparatus 10 due to an increase in the height of the main body part 12 are considered, a range of 5 to 20[°] is suitable. Further, the inclined angle is not limited to these ranges. Note that, in the present embodiment, the inclined angle of 8[°] is configured.

Herein, the discharge port 22 that is provided to the treating tank 16 is disposed at a position in the lowermost portion in an inclined direction of in the treating tank 16 in the present embodiment, as one example. This allows the chemical solution moving down along the inclination to be collected in the position in the lowermost portion of the inclination, and to be discharged to the outside of the treating tank 16 such that the chemical solution does not remain in the treating tank 16. Accordingly, it is possible to exhibit a maximum functional effect by the abovementioned configuration in which the treating tank 16 is disposed by being inclined. Further, the "position in the lowermost portion in the inclined direction" is not limited to the position of the discharge port 22 illustrated in FIGS. 2, 4, and 5, but includes a position of the bottom surface of the treating tank 16 and positions of side surfaces of the treating tank 16 in the surrounding of the position of the discharge port 22, and positions of corner portions between the bottom surface and the side surfaces in the lowermost portion in the inclined direction. Note that, the number, the shape, and the like of the discharge ports 22 are not specially limited.

Moreover, the treating tank 16 is disposed, as one example in the present embodiment, by being inclined so as to move down toward the front surface of the main body part 12 that faces the worker (surface at a side at which the bottle rack 30 and the oven 34 open). Therefore, as compared with the conventional apparatus in which the treating tank 16 is not inclined, an effect that the storage container 38 is likely to be put in and taken out from the treating tank 16 can be obtained. Further, the inclined direction of the treating tank 16 is not limited, and as another example, such a configuration can be considered that the treating tank 16 is disposed by being inclined toward a right or left side of the main body part 12.

Moreover, with the configuration in which the treating tank 16 is disposed by being inclined to the main body part 12, as one example, the opening/closing lid 28 mounted to the upper portion of the treating tank 16 also has a configuration in which the opening/closing lid 28 is inclined at the same angle as the treating tank 16 in a state where the opening/closing lid 28 is closed (see FIGS. 1 and 4. the drawings illustrate a state where the opening/closing lid 28 is open). Herein, as one example in the present embodiment, the opening/closing lid 28 includes, in an inner surface, in the state where the opening/closing lid 28 is closed, a first groove part 42 in a first end portion 28a that becomes a lower portion in the inclined direction, and a second groove part 44 in a second end portion 28b that becomes an upper portion in the inclined direction. Therefore, in the state where the opening/closing lid 28 is closed during when the specimen production treatment is performed, the chemical solution adhered on an inner surface of the opening/closing lid 28 due to dew condensation can caused to move down along the inclination of the opening/closing lid 28, and can be received by the first groove part 42 that is positioned in the lower portion of the inclination. On the other hand, in the state where the opening/closing lid 28 is open after the specimen production treatment has been completed, water droplets adhered on the inner surface of the opening/closing lid 28 at the higher temperature than the ambient temperature due to dew condensation can be caused to move down along the inclination of the opening/closing lid 28, and can be received by the second groove part 44 that is positioned in the lower portion of the inclination. Accordingly, the moisture can be prevented from entering the inside of the treating tank 16, and the moisture can be specially prevented from adhering on the tissue piece in the inside of the treating tank 16 when the opening/closing lid 28 is opened.

Note that, the opening/closing lid 28 is configured so as to be opened from a front surface side toward a rear surface side of the main body part 12, as one example in the present embodiment, and a movable range thereof is set as appropriate in accordance with the inclination of the treating tank 16. This can prevent feeling of oppression from providing to the worker because a line of sight of the worker overlaps with the longitudinal direction of the opening/closing lid 28 when the worker opens the opening/closing lid 28, and can prevent the opening/closing lid 28 from being erroneously and easily closed, for example.

Moreover, the through holes 40 provided in the storage container 38 that is housed in the treating tank 16 are formed, as illustrated in FIG. 3, in a circular shape as one example in the present embodiment. This configuration is an example of a suitable configuration in which the chemical solution is discharged to the outside of the treating tank 16, as a result of various considerations about a form of the storage container 38 by the inventors. Therefore, the holes are firstly disposed to the storage container 38, whereby the chemical solution can be dropped from the holes to the bottom surface of the treating tank 16, and thus can be moved downward. In addition, in the present embodiment, in the storage container 38 that is arranged by being inclined, the through holes 40 having a circular shape that includes no corner portion and no end portion are disposed, so that the chemical solution is caused to move down along an inner edge of each circular hole and is dropped from a lower end of an arc of the circle, thereby making it possible to facilitate the effect of discharging the chemical solution from the through holes 40. Note that, each through hole 40 is formed as a hole by punched metal in the present embodiment, but is not limited thereto, and for example, holes may be formed after wires are knitted to configure the storage container 38.

In addition, as another example, each through hole 40 may be formed in a polygonal shape or an oval shape. At this time, it is suitable to employ such a configuration (which is not illustrated) that one vertex of each through hole 40 when being formed in the polygonal shape or one end portion of the through hole 40 when being formed in the oval shape is arranged at a position in the lower portion of the inclined direction in a state where the storage container 38 is housed in the treating tank 16. This configuration is also another example of a suitable configuration in which the chemical solution is discharged to the outside of the treating tank 16, as a result of various considerations about a form of the storage container 38 by the inventors. Therefore, a vertex of the polygonal shape or an end portion of the oval shape is arranged at a position in the lower portion of the inclined direction of the storage container 38, so that the chemical solution is caused to move down along an inner edge of the hole of the polygonal shape or the oval shape, and is dropped from the vertex or the end portion in the lower end, thereby making it possible to facilitate the effect of dropping the chemical solution from the through holes 40. Note that, the abovementioned polygonal shape includes a triangle, a quadrangle (square, rectangle, rhomboid, or the like), a pentagon, or the like, and further includes a shape modeled after a triangle, a quadrangle (square, rectangle, rhomboid, or the like), a pentagon, or the like, which is formed by rounding these vertexes. Moreover, the abovementioned oval shape includes from an ellipse to a rod-like shape that is formed by rounding long end portions. Moreover, the number, the size, and the like of the through holes 40 are not specially limited, and it can also be considered that the shape of each through hole 40 is made to be another shape other than the shapes of the abovementioned two examples.

With the configuration in the foregoing, the treating tank is disposed by being inclined, whereby the configuration in which the storage container and tissue pieces (as one example, a state of being housed in the cassette) to be housed in the treating tank can be arranged by being inclined. Accordingly, the chemical solution adhered on the cassettes and the storage container is caused to move down along the inclined surface (specially, bottom surface of the storage container) with the effect of the gravity, thereby making it possible to drop the chemical solution from the plurality of through holes (discharge the chemical solution from the storage container to the bottom surface of the treating tank). In addition, the chemical solution flowed out to the bottom surface of the treating tank can be discharged to the outside of the treating tank while causing the chemical solution to move down along the inclined surface (bottom surface of the treating tank) with the effect of the gravity and to be collected. As a result, it is possible to provide a tissue piece treating apparatus that is excellent in liquid exhaustion from a treating tank, suppresses degradation due to concentration reduction of the chemical solution, and suppresses a replacement frequency of the chemical solution, thereby making it possible to reduce a use amount of the chemical solution, as compared with the conventional one.

Note that, the present invention is not limited to the embodiment having been described above, but various changes can be made without deviating from the scope of the present invention.

What is claimed is:

1. A tissue piece treating apparatus, comprising:
   a main body part comprising an interior defined by a front surface separating opposing side surfaces;
   a storage container in which a tissue piece is operable to be housed; and
   a treating tank in which the storage container is housed, the storage container comprising at least one discharge port,
   wherein the storage container includes a plurality of through holes,
   wherein the treating tank is disposed to the main body part by being inclined relative to a horizontal direction,
   wherein the storage container is housed in the treating tank by being inclined at the same angle as the treating tank, and
   wherein the at least one discharge port is disposed in the treating tank at a position corresponding to the lowermost portion of the treating tank in the inclined direction.

2. The tissue piece treating apparatus according to claim 1, wherein the treating tank is disposed by being inclined downward toward the front surface of the main body part.

3. The tissue piece treating apparatus according to claim 1, comprising an opening/closing lid that opens and closes an opening part in an upper portion of the treating tank, wherein the opening/closing lid includes, in a state where the opening/closing lid is closed, in an inner surface thereof, a first groove part in a first end portion that becomes a lower portion in an inclined direction, and a second groove part in a second end portion that becomes an upper portion in the inclined direction.

4. The tissue piece treating apparatus according to claim 1, wherein the through hole is formed in a polygonal shape or an oval shape, and is provided such that one vertex in a case of the polygonal shape or one end portion in a case of the oval shape is arranged at a position in the lower portion in the inclined direction in a state where the storage container is housed in the treating tank.

5. The tissue piece treating apparatus according to claim 1, wherein the through hole is formed in a circular shape.

* * * * *